US008572738B2

(12) United States Patent
Amundsen (10) Patent No.: US 8,572,738 B2
(45) Date of Patent: Oct. 29, 2013

(54) ON DEMAND VIRUS SCAN

(75) Inventor: Lance C. Amundsen, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 1432 days.

(21) Appl. No.: 11/608,119

(22) Filed: Dec. 7, 2006

(65) Prior Publication Data

US 2008/0141375 A1    Jun. 12, 2008

(51) Int. Cl.
*G06F 11/30* (2006.01)
(52) U.S. Cl.
USPC .............. 726/24; 713/187; 713/188; 713/189
(58) Field of Classification Search
USPC ................................ 726/22–25; 713/187–189
See application file for complete search history.

(56) References Cited

U.S. PATENT DOCUMENTS

| | | | |
|---|---|---|---|
| 5,764,972 A * | 6/1998 | Crouse et al. ................... 707/1 |
| 6,167,407 A | 12/2000 | Nachenberg et al. |
| 6,594,686 B1 * | 7/2003 | Edwards et al. .............. 709/203 |
| 6,851,057 B1 | 2/2005 | Nachenberg |
| 6,851,058 B1 * | 2/2005 | Gartside ........................ 726/24 |
| 6,944,772 B2 | 9/2005 | Dozortsev |
| 7,069,589 B2 * | 6/2006 | Schmall et al. ................. 726/24 |
| 7,093,002 B2 * | 8/2006 | Wolff et al. .................... 709/219 |
| 7,191,438 B2 * | 3/2007 | Bryant .......................... 717/176 |
| 7,730,270 B2 * | 6/2010 | Dunlop et al. ................. 711/161 |
| 2002/0052884 A1 * | 5/2002 | Farber et al. ............... 707/104.1 |
| 2002/0066024 A1 * | 5/2002 | Schmall et al. ............... 713/200 |
| 2002/0174349 A1 * | 11/2002 | Wolff et al. ................... 713/188 |
| 2003/0079132 A1 * | 4/2003 | Bryant ......................... 713/182 |
| 2003/0115479 A1 * | 6/2003 | Edwards et al. .............. 713/200 |
| 2004/0003275 A1 * | 1/2004 | Nakada et al. ................ 713/193 |
| 2004/0193659 A1 * | 9/2004 | Carlson et al. ............... 707/204 |
| 2005/0132184 A1 | 6/2005 | Palliyil et al. |
| 2005/0149749 A1 * | 7/2005 | Van Brabant ................. 713/200 |
| 2006/0167948 A1 | 7/2006 | Pietravalle |
| 2006/0236398 A1 * | 10/2006 | Trakic et al. ................... 726/24 |
| 2008/0141375 A1 * | 6/2008 | Amundsen ..................... 726/24 |

FOREIGN PATENT DOCUMENTS

EP         1256877 A1     11/2002

OTHER PUBLICATIONS

Suh et al., "Design and Implementation of the AEGIS Single-Chip Secure Processor Using Physical Random Functions", 2005.

(Continued)

*Primary Examiner* — Eleni Shiferaw
*Assistant Examiner* — Phy Anh Vu
(74) *Attorney, Agent, or Firm* — Lieberman & Brandsdorfer, LLC (57) ABSTRACT

A method and apparatus are provided for performing periodic virus scans on a computer system that mitigates utilization of system resources. All objects designated as non-recently used are placed in an archived format and rendered un-executable. The archived objects are omitted from periodic virus scans. At such time as a request for an archive object is received, or access to an archived object is otherwise required, the archived object is converted to a non-archived state. In addition, before the returned object is made available to a requester, the recently converted object is subject to a virus scan on-demand. Accordingly, the periodic virus scan omits all archived objects, which will only be subject to a virus scan upon receipt of request to the archived object.

33 Claims, 4 Drawing Sheets

(56) References Cited

OTHER PUBLICATIONS

Uluski et al., "Characterizing Antivirus Workload Execution", ACM SIGARCH Computer Architecture News, vol. 33, No. 1, Mar. 2005, pp. 90-98.

Kienzle et al., "Recent Worms: A Survey and Trends", WORM, Oct. 27, 2003, pp. 1-10.

Weaver et al., "A Taxonomy of Computer Worms", WORM, Oct. 27, 2003.

* cited by examiner

ON DEMAND VIRUS SCAN

BACKGROUND OF THE INVENTION

1. Technical Field

This invention relates to implementing a virus scan tool on a computer. More specifically, the invention relates to balancing between the requirements of scanning an object to detect a virus and maintaining efficient operation of a computing environment.

2. Description of the Prior Art

A computer virus is a self replicating piece of code or computer program written to alter the way a computer operates. For the most part, a virus is loaded into a computer without permission or knowledge of the user. Viruses can be intentionally destructive, e.g. destroy data or affect operating efficiency of a computer system, and others can be benign or merely annoying. Regardless of the intent of the virus, most computer users prefer to have a virus-free computer system.

One technique to protect a computer system against computer viruses and other undesirable software entities is to periodically scan the potentially infectable objects (e.g., applications, files, etc.) on the system for the presence of known viruses, or new viruses that are sufficiently similar to known viruses to be detected using available algorithms. However, this process can be time-consuming, especially as the size of computer systems and the number of known viruses increase.

More particularly, existing anti-virus software makes use of a large variety of algorithms to detect the presence of computer viruses and other undesirable software entities (hereinafter simply referred to as "viruses".) As the size of a typical system increases, and the number and complexity of known viruses and the objects that they infect increases, the time required to check a typical system for viruses also increases. Various techniques for increasing the speed of these checks are known in the art. In general, most of these known techniques involve improved algorithms for deciding whether a given object contains a virus, independent of any information about the object other than its current contents.

Various techniques for increasing the speed of virus scanning are known in the art. One such technique uses a database to maintain information about the status of scanned objects at the time the last scan was performed, and then using that database to determine which objects are new, or have changed in significant ways, since the last scan. Scanning only these objects can significantly reduce the time taken to perform the scan. However, this technique is not effective when one or more new viruses have been added to the set being scanned for. That is, since the new viruses were not scanned for the last time, the fact that an object has not changed since the last scan cannot be taken as indicating that the object is free of a known virus. As new computer viruses continue to appear more and more frequently, and network connectivity makes it feasible to update the virus list more and more often, the effectiveness of these known techniques for increasing the speed of virus scanning can be expected to decline significantly.

As explained above, a scan of a computer system for a virus utilizes computer resources. Therefore, there is a need for a virus scan technique that effectively scans for a virus while mitigating utilization of computer resources. Such a technique should accommodate scanning changed and unchanged objects since the previous virus scan.

SUMMARY OF THE INVENTION

This invention comprises a method, system, and article of manufacture to mitigate utilization of system resources, while effectively scanning for viruses in the system.

In one aspect of the invention, a method is provided for detecting a computer virus. A group of objects that have not been accessed or otherwise utilized for a set time interval are identified as non-recently used objects. This group of identified objects is archived such that the objects are rendered non-executable. A search for presence of a virus is conduced. The virus search includes periodically scanning for a virus on all non-archived objects while bypassing all archived objects. Access is granted to the scanned object if there is no virus present in the scanned object. Similarly, access to the scanned object is denied if a virus is present in the scanned object.

In another aspect of the invention, a computer system is provided with a processor in communication with storage media, and an object in communication with the storage media. The object is designated as a non-recently used object, and an archive tool in communication with the storage media archives the object designated as non-recently used. A virus scan tool in communication with the processor and the storage media is provided to scan for the presence of a virus on all non-archived objects in communication with the storage media, while bypassing all archived objects. The virus scan tool periodically searches for presence of a virus in all non-archived objects. Access to the non-archived objects is denied if it is determined that it contains a virus. Similarly, access to the non-archived and scanned object is granted if it is determined that it does not contain a virus.

In yet another aspect of the invention, an article of manufacture is provided with a tangible computer readable carrier with computer program instructions for detecting the presence of a virus in an object in communication with storage media. Instructions are provided for designating a group of non-recently used objects, and for archiving these designated objects into a non-executable state. In addition, instructions are provided for configuring a set of instructions to scan for a virus on all non-archived objects. These instructions bypass all archived objects during the scan. Instructions are also provided to determine presence of a virus in an object in communication with the storage media. Access is granted to the scanned object if it is determined that a virus is absent there from, and access to the scanned object is denied if it is determined that a virus is present in the object.

In an even further aspect of the invention, a computer system is provided with a processor in communication with an operating system and storage media. An archive tool in communication with the operating system is provided in the system to convert non-recently used objects into an archived format. In addition, a virus detection tool in communication with the operating system is provided to periodically scan all non-archived objects in the storage media to search for the presence of a virus. This virus scan is limited to non-archived objects.

In yet a further aspect of the invention, an article is provided with a tangible computer readable carrier having computer program instructions configured to cause a computer to detect a virus. Instructions are provided to convert non-recently used objects into a non-executable format. In addition, instructions are provided to restore the non-executable formatted object to an executable format in response to an access request to the object, followed by a search of the object for the presence of a virus.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A virus detection system is provided to scan objects for the presence of a virus. The virus scan reviews all non-archived objects of the storage media on a periodic basis. In addition, all objects that are designated as non-recently used objects are converted into an archived format. The term "archive" is a broad term that refers to the process in which a computer system places an object into a non-accessible storage format. For example, in one embodiment, the term archive includes archiving the subject object. These archived objects cannot be readily accessed unless they are converted from the archived format to the non-archived format. At the same time, the archived format enables such objects to be omitted from periodic virus scans. Although an archived object is susceptible to attack by a virus, such objects are not at risk to infect a computer system since they cannot be executed or accessed when in an archived format. In effect, a virus insertion into an archived object is rendered useless at such time as the object is archived. By subjecting non-recently used objects to archiving and omitting archived objects from periodic virus scans, there is a reduced burden on the computer system when performing such virus scans.

Technical Details

Figure 1:
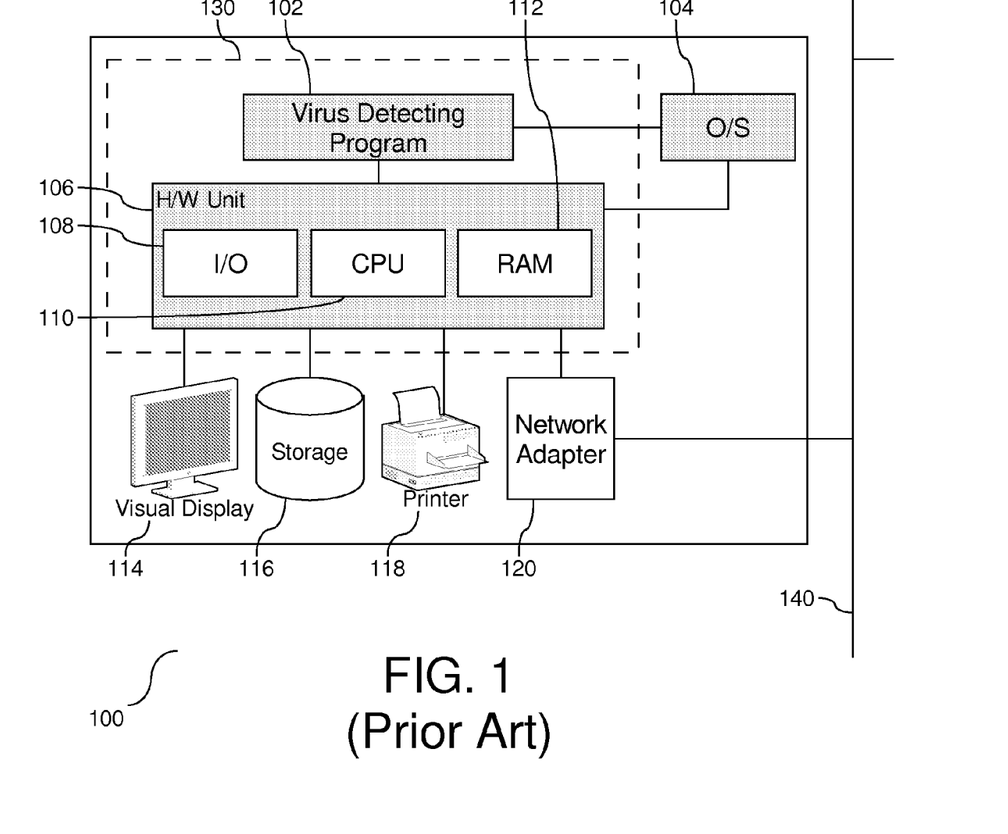
FIG. 1 is a prior art block diagram of a computer system.

FIG. 1 is a block diagram (100) showing an exemplary data processing or computer system (100) on which one embodiment of the present invention operates. The computer system (100) includes a computer platform (130) having a hardware unit (106), and a virus-detecting program (102) that implements the method depicted in FIG. 4. The virus-detecting program (102) operates on the computer platform (130) and hardware unit (106). The hardware unit (106) typically includes one or more central processing units (CPUs) (110), random access memory (RAM) (112) and an input/output (I/O) interface (108). Various peripheral components may be connected to the computer platform (130). Typically provided peripheral components include a visual display (114), a data storage device (e.g. tape or disk) (116), and a printing device (118). A connection (112) may also be included to connect the system (100) to one or more other similar computer systems. In one embodiment, the connection (112) is a network adapter to connect the system (100) to a local or wide area network (140). The connection (112) is used to transmit digital information between computer (100) and another computing device across the network (140). An operating system (104) coordinates the operation of the various components of the computer system (100), and is also responsible for managing the various objects or files, and for recording certain information regarding same, such as date and time last modified, file length, etc.

Figure 2:
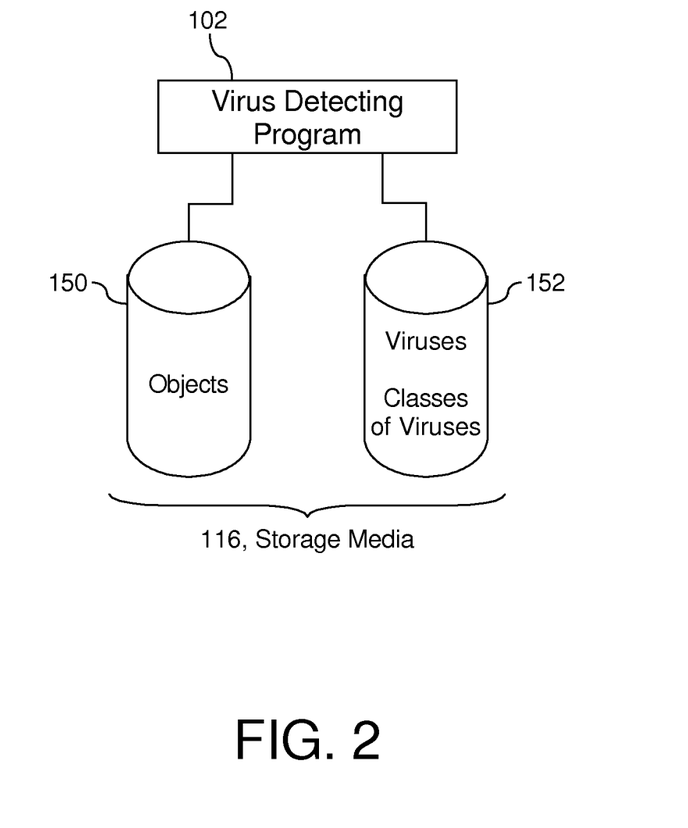
FIG. 2 is a block diagram of a virus detecting program in communication with the computer system.

Referring now as well to FIG. 2, in this embodiment the virus-detecting program (102) has access to a collection of potentially-infectable objects (150), to a set of descriptions of known viruses and classes of viruses (152), etc. The collection of potentially-infectable objects (150) can comprise, by way of example, documents, files and boot records that are stored on the storage media (116). In one embodiment, the potentially infectable objects may reside in the RAM (112). Accordingly, as shown herein, the virus detecting program (102) is in communication with the computing platform (130), the objects (150) stored in storage media (116) and the virus descriptions (152).

Figure 3:
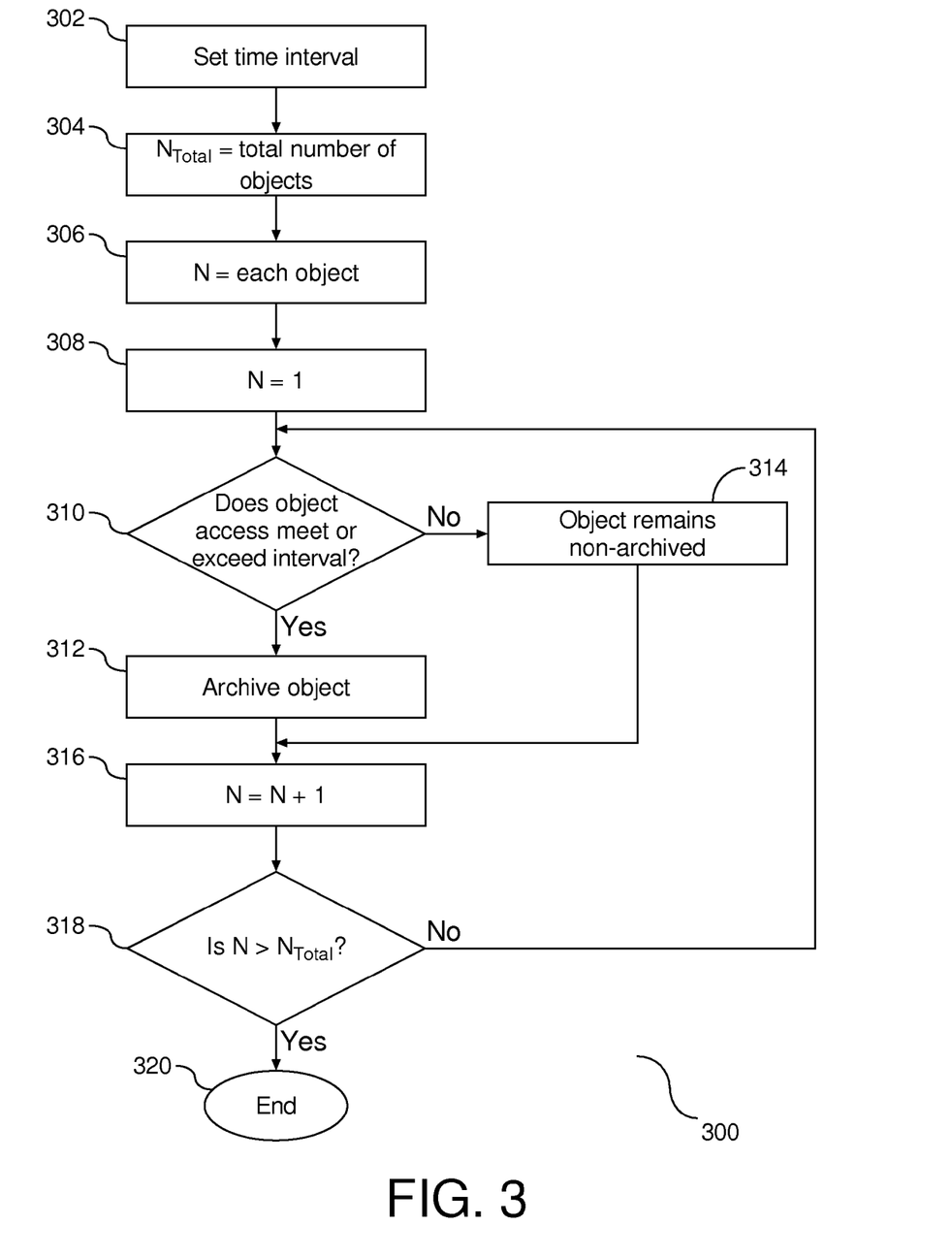
FIG. 3 is a flow chart illustrating a process for archiving non-recently used objects.

FIG. 3 is a flow chart (300) illustrating an example of a process for archiving objects that are not frequently used by the computer platform. A time interval is set as a parameter to indicate when an object has not been used or accessed for a set period of time (302). In addition, the total number of objects in communication with the computer platform is defined as $N_{Total}$ (304). In one embodiment, the interval may be changed to increase or decrease the time interval parameter. The variable N is assigned to represent each object subject to review (306). Initially, the variable N is assigned to the integer 1 (308). For each object, N, (306), a determination is made as to whether the time interval from when the object was last access or opened meets or exceeds the time interval parameter (310). If the response to the determination at step (310) is positive, the object, N, is archived (312). Alternatively, if the response to the determination at step (310) is negative, the object, N, is not archived (314). Following either step (312) or (314), the variable N is incremented (316), and a test is conducted to determine if the value of the variable N is greater than the total number of objects in communication with the computer platform (318). If the response to the determination at step (318) is negative, the archiving process returns to step (310). If the response to the determination at step (318) is positive, the archiving process concludes (320). At such time as access to the archived object is requested, the object may be un-archived into an accessible storage format. In one embodiment, the process of un-archiving an object may include converting the object from a compressed format to a non-compressed format. The above-outlined flow diagram illustrates one embodiment for archiving objects of a computer platform. However, there are other algorithms that may be implemented to archive non-recently used objects. Accordingly, the first part of the virus scan procedure is to archive all non-recently used objects and make them temporarily unavailable to the user.

Figure 4:
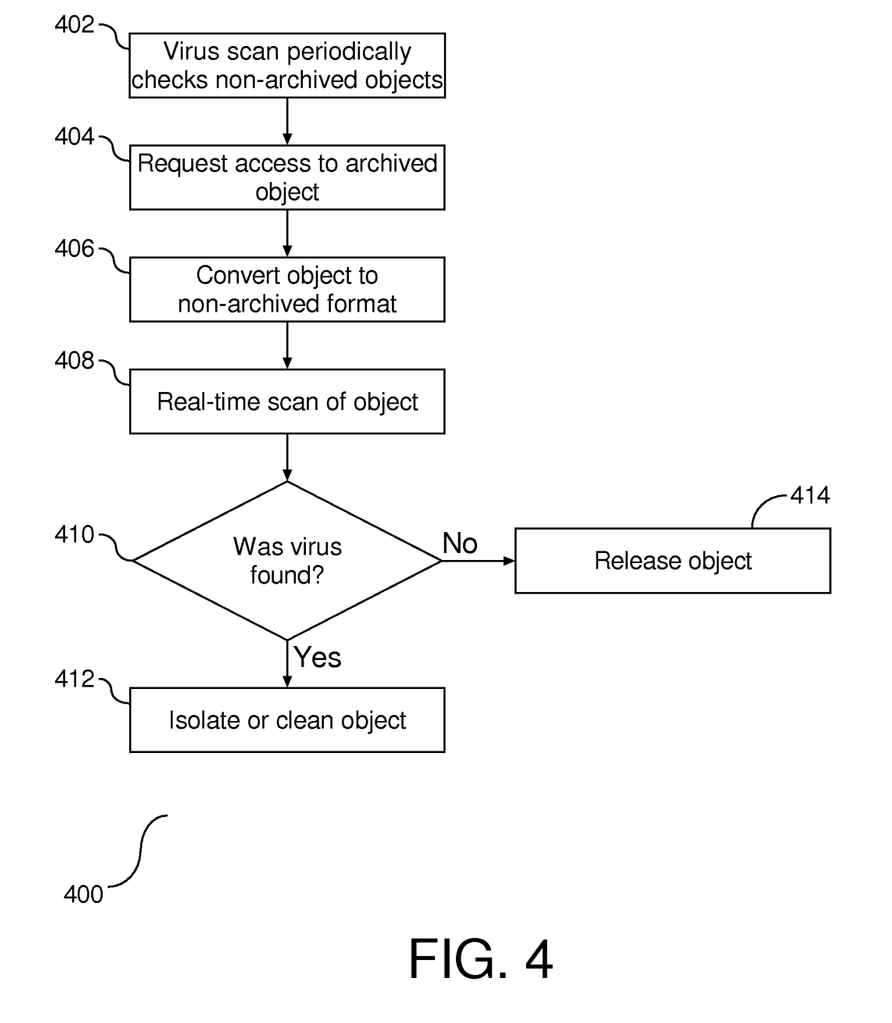
FIG. 4 is a flow chart illustrating a process for conducting a virus scan on objects in communication with storage media of the computer system according to the preferred embodiment of this invention, and is suggested for printing on the first page of the issued patent.

FIG. 4 is a flow chart (400) illustrating one embodiment for scanning objects for a virus in an object. Virus scan instructions periodically check non-archived objects to determine presence of a virus while bypassing all archived objects (402). An archived object infected with a virus will not alter the way a computer operates until such time as the object is accessed, executed, or otherwise utilized. In other words, an archived object infected with a virus is effectively isolated. By bypassing the archived objects, the virus scan mitigates the quantity of objects subject to the scan while not affecting operation of the computer. The virus scan continues the periodic review of non-archived objects at preset intervals.

As noted above, all non-recently used objects are archived. Upon receiving a request to access an archived object in communication with storage media (404), the requested archived object or set of objects is converted from the archived format to a non-archived format (406), i.e. un-archived, and a real-time virus scan of the converted object is conducted to determine presence of a virus in the specified object (408). In one embodiment, the access request at step (404) may include a plurality of objects and the real-time scan is limited to the object or set of objects converted at step (406). Similarly, in one embodiment, an executable object may include an executable program, a macro, or any object that may include executable code. Following conversion of the object at step (406) and the real-time scan (408) on the select converted object(s), a determination is conducted as to whether a virus has been detected in the specified non-archived object (410). If the response to the determination at step (410) is positive, the specified object is isolated or cleaned (412) to ensure that the virus is not released to infect other objects in the computer platform. Conversely, if the response to the determination at step (410) is negative, the specified object is released (414) for execution if it is an executable object or made accessible in the computer-readable medium of the specified object is a non-executable object.

As outlined above in FIG. 4, the archived object may be an executable file or a non-executable file. In either format, the file is selected for un-archiving and then subject to a virus scan to determine if there is a virus present in the selected file. As is known in the art a virus scan instruction can only scan for viruses that are within a set of instructions. New viruses may have been created since the previous update of the virus scan. As such, an update of the virus scan instructions prior to review of archived objects enables the archived objects to be un-archived and subject to a virus scan utilizing the most recent virus detection instructions.

Advantages Over the Prior Art

An algorithm is used to determine when a file system object has not been used for a set period of time and to designate such objects as non-recently used. This set time interval may be static or dynamic. All objects designated as non-recently used are archived. Once these objects are archived, they are rendered non-executable and remain archived until such time as a request is made to access one or more of the archived objects. A periodic virus scan of all objects in the file system is limited to the non-archived objects and bypasses archived objects. Accordingly, the periodic virus scan eliminates the need to review archived objects.

At such time as a request for an archived object is made, the requested object is non-archived. In one embodiment, the request may be in the form of a processor receiving a request from a specific application. To ensure that a virus is not present in the recently non-archived object, the virus scan checks the un-archived object to determine if a virus is present prior to opening or executing the object(s). The virus scan of the un-archived object is conducted in real-time and is limited to the recently un-archived object(s). In one embodiment, the virus scan instructions use the most recent virus definitions to search for a virus embedded in the recently un-archived object. Accordingly, the real-time virus scan of an object recently converted from an archived format to a non-archived format mitigates overhead by limiting the virus scan to a select object or group of objects.

Alternative Embodiments

It will be appreciated that, although specific embodiments of the invention have been described herein for purposes of illustration, various modifications may be made without departing from the spirit and scope of the invention. In particular, at such time as a request is invoked to an archived object, the virus scan definitions may be updated. This update may occur prior to or simultaneous with the process of un-archiving the archived object(s). This ensures that the requested archived objects are scanned for the most recent virus definitions. In addition, the objects subject to the virus scan review should not be limited to persistent storage. Rather, the objects that may be archived include objects in memory, and any object that may include computer executable instructions. Accordingly, the scope of protection of this invention is limited only by the following claims and their equivalents.

I claim:

1. A computer implemented method for detecting a computer virus, comprising:
   identifying a group of non-recently accessed objects, wherein an access to an object includes read and write operations associated with the object and non-recently accessed defined by an interval parameter;
   identifying one or more objects within the group having time from last access that at least meets the interval parameter;
   archiving the identified objects, wherein the step of archiving said identified objects renders said objects in an archived state un-executable;
   searching for presence of a virus, including periodically scanning for a virus on all non-archived objects in a file system while bypassing all archived objects in said file system; and
   granting access to a scanned object if it is determined that no virus is found in said scanned object, and denying access to said scanned object if it is determined that a virus is present.

2. The method of claim 1, further comprising converting a specified archived object to a non-archived state responsive to a request for access to said specified archived object, and performing a virus scan of a converted object to determine presence of a virus in said converted object.

3. The method of claim 2, wherein the step of performing a virus scan of said converted object is conducted in real-time.

4. The method of claim 2, wherein the step of performing a virus scan of said converted object is responsive to an access request to said specified archived object.

5. The method of claim 4, further comprising restricting said virus scan to said converted object.

6. The method of claim 5, further comprising executing said converted and scanned object if said converted and scanned object is executable code and if it is determined that no virus is found in said converted and scanned object.

7. The method of claim 6, further comprising granting access to said converted and scanned object if said converted and scanned object is non-executable code and if it is determined that no virus is found in said converted and scanned object.

8. The method of claim 6, further comprising denying access to said converted and scanned object if it is determined that a virus is present.

9. A system comprising:
   a memory and a processor in communication with storage media, the memory including an archive tool and a virus scan tool:
   an object in communication with said storage media designated as non-recently accessed, wherein an access to an object includes read and write operations associated with the object and non-recently accessed defined by an interval parameter; wherein said non-recently accessed is determined by having time of a last access of the object that at least meets the interval parameter;

said archive tool in communication with said storage media to archive said non-recently accessed object, the archive tool to convert said non-recently accessed object into an archived storage format;

a-said virus scan tool in communication with said processor and said storage media to scan for a virus on all non-archived objects in said storage media while bypassing all archived objects in said storage media; and said virus scan tool to periodically search for presence of a virus in all non-archived objects, and to deny access of said processor to a non-archived object if a virus is present and to grant access of said processor to said non-archived object if a-no virus is absent from found in said object.

10. The system of claim 9, further comprising said archive tool to convert a specified archived object to a non-archived format to create a converted object in response to receipt of a request from said processor to access said specified archived object, and for said virus scan tool to search said converted object for presence of a virus in said converted object.

11. The system of claim 10, wherein said search of said converted object for a virus is conducted in real-time.

12. The system of claim 10, wherein said search of said converted object for a virus is conducted in response to an access request to said converted object.

13. The system of claim 12, further comprising a restriction of said virus scan tool to said converted object.

14. The system of claim 13, further comprising execution of said converted and scanned object if said converted and scanned object is executable code and if it is determined that no virus is found in said converted and scanned object.

15. The system of claim 13, further comprising a granting of access to said converted and scanned object if said converted and scanned object is non-executable code and if it is determined that no virus is found in converted and scanned object.

16. The system of claim 13, further comprising a denial of access to said converted object if it is determined that a virus is present.

17. An article comprising:
a non-transitory computer readable storage medium including computer program instructions configured to cause a computer to detect presence of a virus in an object in communication with storage media, comprising;

instructions to designate a group of non-recently accessed objects in a storage device, wherein an access to an object includes read and write-operations associated with the object and non-recently accessed defined by an interval parameter;

instructions to identify one or more objects within the group having time from last access of the object that at least meets the interval parameter;

instructions to place the designated group of objects in an archive state, wherein all objects in said archived state are non-executable;

instructions to scan for a virus on all non-archived objects in said storage device and to bypass all archive state objects during said scan in said storage device; and instructions to determine presence of a virus in an object, including granting access to said scanned non-archived object if it is determined that mno virus is ~ found in said scanned non-archived object, and denying access to said scanned non-archived object if it is determined that a virus is present.

18. The article of claim 17, further comprising instructions to convert a specified archived object to a non-archived object to create a converted object responsive to a request for access to said archived object, and to perform a scan of said converted object to determine presence of a virus in said converted object.

19. The article of claim 18, wherein the instructions to perform a scan of said converted object is responsive to an access request to said archived object.

20. The article of claim 19, further comprising instructions to restrict said virus scan to said converted object.

21. The article of claim 20, further comprising instructions to execute said converted and scanned object if said converted and scanned object is executable code and if it is determined that no virus is found in said converted and scanned object.

22. The article of claim 21, further comprising instructions to grant access to said converted and scanned object if said converted and scanned object is non-executable code and if it is determined that no virus is found in said converted and scanned object.

23. The article of claim 21, further comprising instructions to deny access to said converted object if it is determined that a virus is present.

24. The article of claim 17, wherein the instructions to perform a scan of said converted object is conducted in real-time.

25. A computer system comprising:
a memory and a processor in communication with an operating system and storage media, the memory including an archive tool and a virus detection tool;

said archive tool in communication with said operating system to convert a non-recently accessed object into a compressed format, wherein an access to an object includes read and write-operations associated with the object and non-recently accessed defined by an interval parameter; wherein the non-recently accessed is determined upon time from last access of the object that at least meets a time interval parameter;

said virus detection tool in communication with said operating system to scan all non-archived objects in said storage media for presence of a virus on a periodic basis, while bypassing all archived objects in said storage media, wherein said scan is limited to non-archived objects.

26. The system of claim 25, further comprising an access request for said archived object communicated to said operating system, said archive tool to restore said archived object to a non-archived object in response to receipt of said access request, and said virus detection tool to scan said non-archived object in said access request to determine presence of a virus.

27. The system of claim 26, wherein said virus scan tool determination is limited to said non-archived object.

28. The system of claim 26, wherein said virus scan of said non-archived object is conducted in real-time.

29. An article comprising:
a non-transitory computer readable storage medium including computer program instructions configured to cause a computer to detect a computer virus, comprising:

instructions to convert a non-recently accessed object into a non-executable format in said storage media, wherein an access to an object includes read and write operations associated with the object and non-recently accessed defined by an interval parameter;

instructions to scan for a virus on all objects in an executable format while bypassing all objects in said non-executable format, wherein both executable and non-executable objects are present in said storage media during the scan; and instructions responsive to an access request to said non-executable format object, to restore said non-executable format object to an executable format, and to determine presence of a virus in said restored object.

30. The article of claim 29, further comprising instructions to convert non-recently used objects into a non-executable format when each of said non-recently used objects has not been accessed for a defined time interval.

31. The article of claim 29, wherein said instructions to determine presence of a virus in said restored to said executable format object is limited to determining presence of a virus in said restored to said executable format object.

32. The article of claim 29, further comprising instructions to grant access to said restored to said executable format object if no virus is found in said restored to said executable format object.

33. The article of claim 29, further comprising instructions to deny access to said restored to said executable format object if a virus is present in said restored to said executable format object.

\* \* \* \* \*